United States Patent
Imano et al.

(10) Patent No.: US 8,138,980 B2
(45) Date of Patent: Mar. 20, 2012

(54) ANTENNA DEVICE FOR RADIO APPARATUS AND PORTABLE RADIO APPARATUS

(75) Inventors: Daigo Imano, Miyagi (JP); Mitsuharu Nakasato, Miyagi (JP); Nobuaki Tanaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/885,293

(22) Filed: Sep. 17, 2010

(65) Prior Publication Data

US 2011/0043416 A1  Feb. 24, 2011

Related U.S. Application Data

(62) Division of application No. 11/570,129, filed as application No. PCT/JP2005/017815 on Sep. 28, 2005, now Pat. No. 7,859,467.

(30) Foreign Application Priority Data

Sep. 28, 2004  (JP) ................................. 2004-281586
Apr. 13, 2005  (JP) ................................. 2005-116049

(51) Int. Cl.
*H01Q 1/24* (2006.01)

(52) U.S. Cl. ... 343/702; 343/901; 343/900; 343/700 MS
(58) Field of Classification Search ........................ None
See application file for complete search history.

(56) References Cited

U.S. PATENT DOCUMENTS

| | | | |
|---|---|---|---|
| 6,456,248 B2 | 9/2002 | Ito | |
| 6,940,460 B2 | 9/2005 | Maoz et al. | |
| 7,151,955 B2 | 12/2006 | Huber et al. | |
| 7,253,773 B2 | 8/2007 | Chiba et al. | |
| 7,423,605 B2 * | 9/2008 | Qi et al. | ......................... 343/818 |
| 7,804,451 B2 | 9/2010 | Glocker et al. | |
| 7,859,467 B2 * | 12/2010 | Imano et al. | .................. 343/702 |

(Continued)

FOREIGN PATENT DOCUMENTS

CN 1329449 A 1/2002

(Continued)

OTHER PUBLICATIONS

Chinese Office Action in corresponding Chinese Patent Application No. 200580021352.4 mailed Apr. 29, 2010.

(Continued)

*Primary Examiner* — Trinh V Dinh
(74) *Attorney, Agent, or Firm* — Seed IP Law Group PLLC

(57) ABSTRACT

An object of the present invention is to provide an antenna device for a radio apparatus in which the amount of energy (SAR) absorbed by a head of a human body can be reduced without lowering the power of radio waves transmitted during a call. There is provided a board 108 serving as a base plate of an antenna element, an antenna element 102 disposed in a longitudinally end portion of the board 108 through a feeding portion 107, a conductor plate 109 disposed substantially in parallel with a main surface of the board 108 and disposed on the opposite side to a surface having a sound hole of a receiver portion, and a plurality of short-circuit conductors 110 disposed on a lower end portion of the conductor plate 109. The conductor plate 109 is short-circuited to a lower end portion of the board 108 through the short-circuit conductors 110.

3 Claims, 13 Drawing Sheets

U.S. PATENT DOCUMENTS

| | | |
|---|---|---|
| 2002/0011956 A1 | 1/2002 | Ito |
| 2002/0061734 A1 | 5/2002 | Ito |
| 2002/0193138 A1 | 12/2002 | Chiba et al. |
| 2003/0169206 A1 | 9/2003 | Egawa |
| 2004/0032370 A1 | 2/2004 | Ito et al. |
| 2004/0046701 A1 | 3/2004 | Huber et al. |
| 2007/0164910 A1 * | 7/2007 | Qi et al. .................. 343/702 |
| 2007/0252767 A1 | 11/2007 | Chiba |

FOREIGN PATENT DOCUMENTS

| | | |
|---|---|---|
| CN | 1392673 A | 1/2003 |
| JP | 7-273685 A | 10/1995 |
| JP | 2001308622 A | 11/2001 |
| JP | 2002094311 A | 3/2002 |
| JP | 2002353719 A | 12/2002 |
| JP | 2002353733 A | 12/2002 |
| JP | 2003037413 A | 2/2003 |
| JP | 2003069442 A | 3/2003 |
| JP | 2003142935 A | 5/2003 |
| JP | 2003-273620 A | 9/2003 |
| JP | 2004032808 A | 1/2004 |
| JP | 2004128660 A | 4/2004 |
| JP | 2004-522332 A | 7/2004 |
| JP | 2004-524747 A | 8/2004 |
| JP | 2005150998 A | 6/2005 |
| JP | 2005-522063 A | 7/2005 |
| WO | 03/067702 A2 | 8/2003 |
| WO | 2004/027924 A1 | 4/2004 |

OTHER PUBLICATIONS

European Search Report for European Application No. 05788357.1 mailed May 14, 2009.

European Office Action, mailed Jan. 18, 2011, for EP 05 788 357.1-1248, 8 pages.

* cited by examiner (a)　　　　　　　　　(b)

(a) $\ell < \lambda/2$ (b) $\ell = \lambda/2$ (c) $\lambda/2 < \ell < \lambda$ (d) $\ell = \lambda$

------ : HIGH FREQUENCY CURRENT (a)

(b)

TOTAL LENGTH OF ANTENNA ELEMENT, BOARD,
SHORT-CIRCUIT CONDUCTORS AND CONDUCTOR PLATE (a)  (b)

TOTAL LENGTH OF ANTENNA ELEMENT, BOARD,
SHORT-CIRCUIT CONDUCTORS AND CONDUCTOR PLATE (a)  (b)

TOTAL LENGTH OF ANTENNA ELEMENT, BOARD,
SHORT-CIRCUIT CONDUCTOR AND CONDUCTOR PLATE

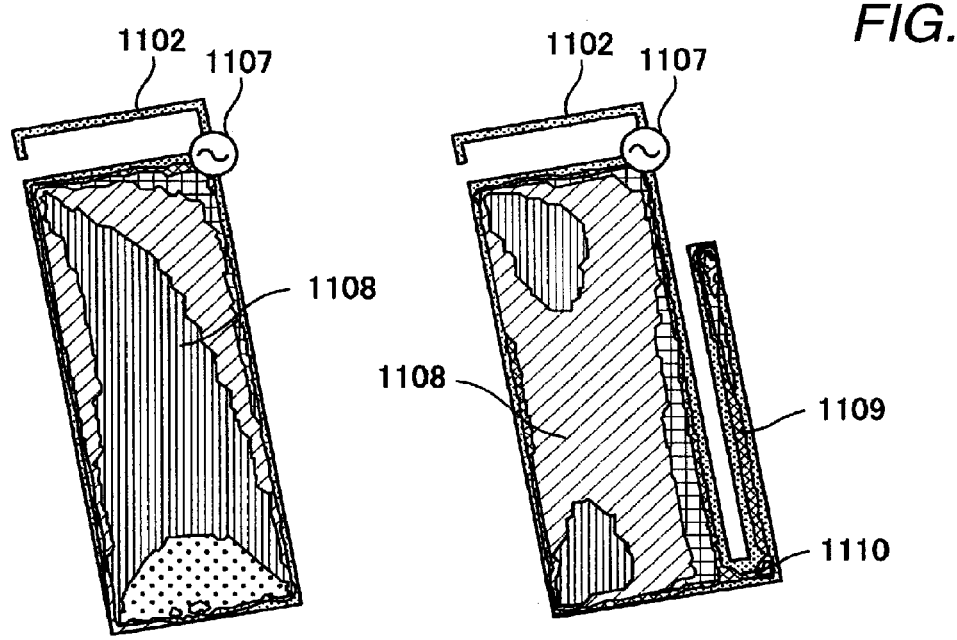
FIG. 13
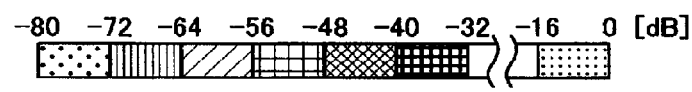
FIG. 14
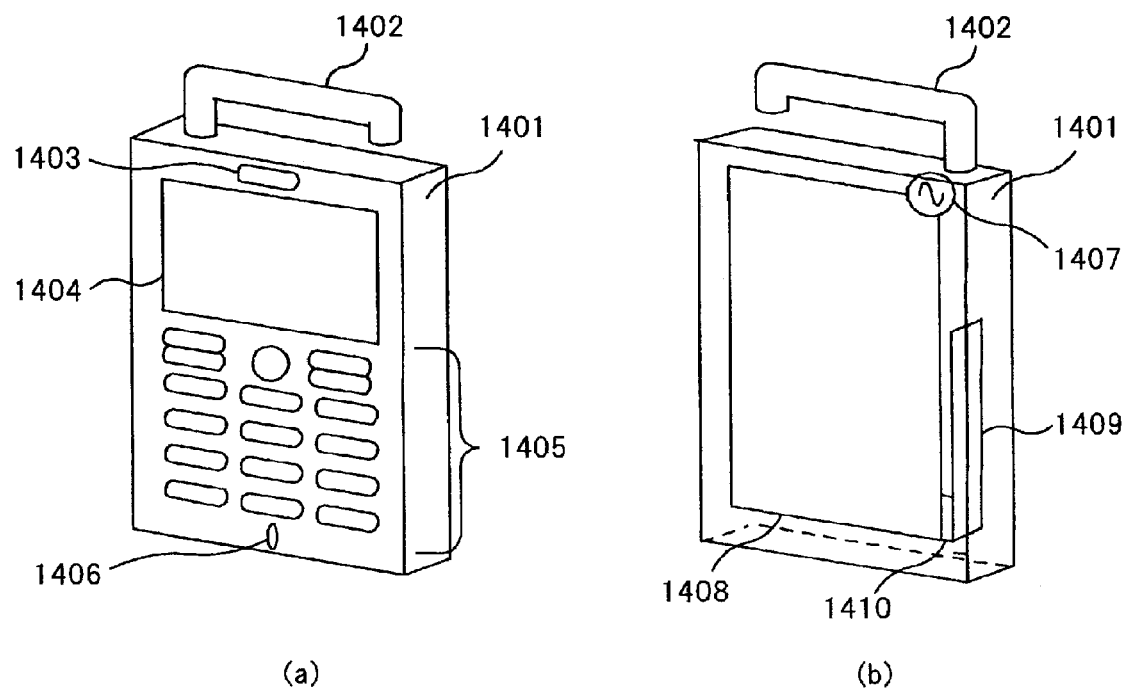
(a)   (b)

(a)  (b)

(a)      (b)

(a)      (b)

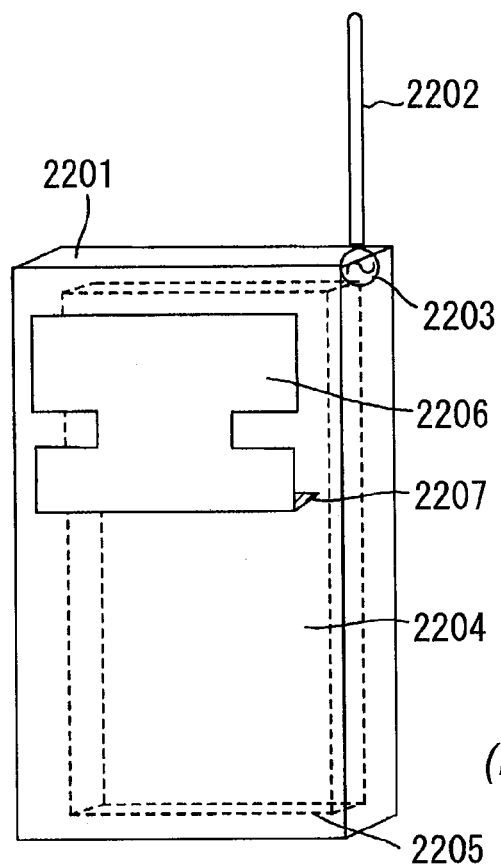
FIG. 22.
*(PRIOR ART)*
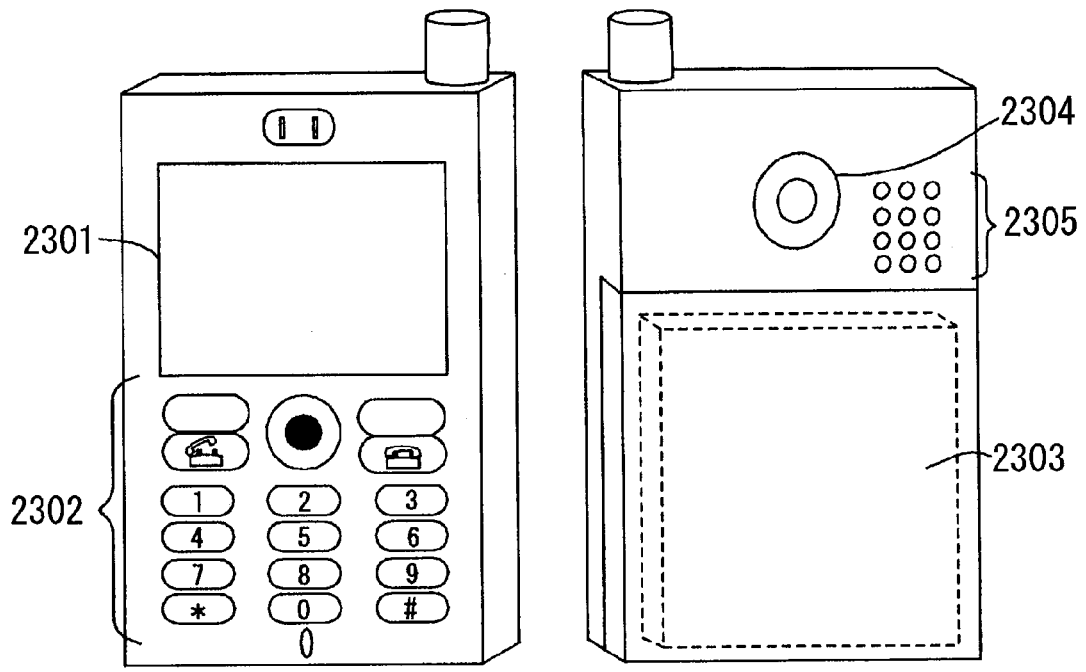
FIG. 23A
*(PRIOR ART)*
FIG. 23B
*(PRIOR ART)*

ANTENNA DEVICE FOR RADIO APPARATUS AND PORTABLE RADIO APPARATUS

CROSS-REFERENCE TO RELATED APPLICATION

This application is a divisional of U.S. patent application Ser. No. 11/570,129, filed Dec. 7, 2006, now U.S. Pat. No. 7,859,467, which is a 371 of PCT/JP2005/017815 filed Sep. 28, 2005, which claims priority under 35 U.S.C. 119 to an application JP 2005-116049 filed on Apr. 13, 2005 and JP 2004-281586 filed on Sep. 28, 2004, which application is incorporated herein by reference in its entirety.

TECHNICAL FIELD

The present invention relates to an antenna device for a radio apparatus, and a portable radio apparatus.

BACKGROUND ART

In recent years, influence of radio waves on human bodies has been paid attention to. There have been reports about the effect of elevation in temperature of a humane body exposed to intensive radio waves, the effect of stimulus to nerves, and the influence of intensity of radio waves on human beings.

The average value of the amount of energy of radio waves transmitted from a radio apparatus such as a portable telephone or the like during a call and absorbed for 6 minutes by a specific site (particularly a head) of a human body (hereinafter referred to as SAR (Specific Absorption Rate) has been regulated by law since June 2002. It is necessary to reduce SAR to be not higher than the regulated value.

In order to reduce SAR, it will go well if the power of radio waves emitted from the radio apparatus is depressed. However, there is a problem that the depression of the power leads to deterioration in speech quality.

As a method for reducing SAR without depressing the power emitted from a radio apparatus, there is a method in which a conductive flat plate having a predetermined shape is short-circuited to a board through a conductor as shown in FIG. 22. FIG. 22 is a view showing the configuration of an antenna mounted on a background-art portable radio apparatus.

As shown in FIG. 22, this portable radio apparatus is constituted by an antenna element 2202, a feeding portion 2203 for feeding power to the antenna, a circuit board 2204, a shield casing 2205 covering the circuit board 2204, a conductive flat plate 2206, and a short-circuit conductor 2207 for short-circuiting one end of the conductive flat plate 2206 to the shield casing 2205. The antenna element 2202 is provided outside a housing 2201 while the feeding portion 2203, the circuit board 2204, the shield casing 2205, the conductive flat plate 2206 and the short-circuit conductor 2207 are provided inside the housing 2201.

The other end of the conductive flat plate 2206 is electrically released from the shield casing 2205, and the length of the conductive flat plate 2206 is selected to be ¼ wavelength of the operating frequency. Consequently, the impedance between the conductive flat plate 2206 and the shield casing 2205 approaches substantially zero in the short-circuited end and infinite in the open end. Thus, a high-frequency current hardly flows from the vicinity of the feeding portion 2203 to the conductive flat plate 2206 or the shield casing 2205. As a result, the quantity of radio waves radiated from the conductive flat plate 2206 or the shied casing 2205 is reduced so that SAR is reduced.

DISCLOSURE OF THE INVENTION

Problems that the Invention is to Solve

Generally, however, a portable radio apparatus is mounted with a display portion 2301 for displaying characters of a telephone number or the like, an input portion 2302 for inputting a telephone number or characters, a battery 2303, a camera portion 2304, and a speaker portion 2305 for outputting sound for informing a user of reception. The display portion 2301 and the input portion 2302 are provided in a front surface portion of the portable radio apparatus while the battery 2303, the camera portion 2304 and the speaker portion 2305 are provided in a back surface portion of the portable radio apparatus. Therefore, when SAR is reduced using the aforementioned method disclosed in Patent Document 1, there are problems that it is difficult to secure the length of the conductive flat plate 2206 to be ¼ wavelength of the operating frequency, and it is difficult to decide the position of the short-circuited point of the conductive flat plate 2206 desirably or to short-circuit the conductive flat plate 2206 all over the lateral direction of the board.

Means for Solving the Problems

An antenna device for a radio apparatus according to the present invention was invented in consideration of the aforementioned problems. The antenna device for a radio apparatus according to the present invention is configured so that SAR can be reduced even in the state where parts, such as a display portion, an input portion, a battery, a camera, etc., provided in a portable radio apparatus are mounted. That is, the antenna device for the radio apparatus according to the present invention includes a base plate, an antenna element disposed on a longitudinally upper end portion of a main surface of the base plate through a feeding portion, a conductor plate disposed to face the main surface of the base plate in parallel thereto, and a plurality of short-circuit conductors connected to a lower end portion of the conductor plate, wherein the conductor plate is short-circuited to a longitudinally lower end portion of the base plate through the plurality of short-circuit conductors.

With this configuration, peaks of a high frequency current contributing to radiation from the antenna are distributed so that SAR can be reduced without limiting the length of the conductor plate or short-circuiting the conductor plate all over the lateral direction of the base plate in order to prevent influence of electronic parts mounted on the radio apparatus.

In the antenna device for the radio apparatus according to the present invention, the conductor plate is provided between the base plate and a back surface of a housing of the radio apparatus.

With this configuration, a distance is secured between the conductor plate and the base plate so that the influence caused by capacitive coupling can be reduced.

The antenna device for the radio apparatus according to the present invention includes a frame-like conductor plate whose central portion has been cut out.

With this configuration, peaks of a high frequency current contributing to radiation from the antenna are distributed so that SAR can be reduced without limiting the length of the conductor plate or short-circuiting the conductor plate all over the lateral direction of the base plate in order to prevent influence of electronic parts mounted on the radio apparatus.

The antenna device for the radio apparatus according to the present invention includes a U-shaped conductor plate.

With this configuration, peaks of a high frequency current contributing to radiation from the antenna are distributed so that SAR can be reduced without limiting the length of the conductor plate or short-circuiting the conductor plate all over the lateral direction of the base plate in order to prevent influence of electronic parts mounted on the radio apparatus.

An antenna device for a radio apparatus according to the present invention includes a base plate, an antenna element disposed on a longitudinally upper end portion of a main surface of the base plate through a feeding portion, a conductor plate disposed on a lateral side of the main surface of the base plate, and a short-circuit conductor connected to a lower end portion of the conductor plate, wherein the conductor plate is short-circuited to a longitudinally lower end portion of the base plate through the short-circuit conductor.

With this configuration, peaks of a high frequency current contributing to radiation from the antenna are distributed so that SAR can be reduced without limiting the length of the conductor plate or short-circuiting the conductor plate all over the width direction of the base plate in order to prevent influence of electronic parts mounted on the radio apparatus.

The antenna device for the radio apparatus according to the present invention is configured so that a main surface of the conductor plate is perpendicular to the main surface of the base plate.

With this configuration, peaks of a high frequency current contributing to radiation from the antenna are distributed so that SAR can be reduced without limiting the length of the conductor plate or short-circuiting the conductor plate all over the width direction of the base plate in order to prevent influence of electronic parts mounted on the radio apparatus.

An antenna device for a radio apparatus according to the present invention includes a base plate, an antenna element disposed on a width-direction one end portion of a main surface of the base plate through a feeding portion, a conductor plate disposed in parallel to a width direction of the main surface of the base plate, and a short-circuit conductor connected to an end portion of the conductor plate, wherein the conductor plate is short-circuited to a width-direction other end portion of the main surface of the base plate through the short-circuit conductor.

With this configuration, peaks of a high frequency current contributing to radiation from the antenna are distributed so that SAR can be reduced without limiting the length of the conductor plate or short-circuiting the conductor plate all over the width direction of the base plate in order to prevent influence of electronic parts mounted on the radio apparatus.

The antenna device for the radio apparatus according to the present invention is configured so that a total sum of electric lengths of the antenna element, the base plate, the short-circuit conductor or conductors and the conductor plate is larger than ½ wavelength of an operating frequency and not larger than one wavelength of the same.

With this configuration, peaks of a high frequency current contributing to radiation from the antenna are distributed so that SAR can be reduced.

A portable radio apparatus according to the present invention is configured to be mounted with an antenna device for a radio apparatus according to any one of the aforementioned configurations.

With this configuration, peaks of a high frequency current contributing to radiation from the antenna are distributed so that SAR can be reduced without limiting the length of the conductor plate or short-circuiting the conductor plate all over the width direction of the base plate in order to prevent influence of electronic parts mounted on the radio apparatus.

The portable radio apparatus according to the present invention has a structure in which the conductor plate is attached to a cover which can be removed from the housing.

With this configuration, peaks of a high frequency current contributing to radiation from the antenna are distributed so that SAR can be reduced even in a portable radio apparatus supporting a low profile.

The portable radio apparatus according to the present invention is configured so that the conductor plate is a cover formed out of a conductor which can be removed from the housing.

With this configuration, peaks of a high frequency current contributing to radiation from the antenna are distributed so that SAR can be reduced even in a portable radio apparatus supporting a low profile.

Effect of the Invention

In an antenna device for a radio apparatus according to the present invention, peak points of a high frequency current contributing to radiation from the antenna are distributed so that SAR can be reduced.

BRIEF DESCRIPTION OF THE DRAWINGS

[FIG. 13] Views showing a distribution of a high frequency current in the portable radio apparatus shown in FIG. 11.

[FIG. 14] Configuration views of a portable radio apparatus mounted with an antenna device for a radio apparatus according to a fifth embodiment of the present invention.

[FIG. 22] A configuration view of an antenna mounted in a background-art portable radio apparatus so as to reduce SAR.

[FIG. 23] Configuration views of the background-art portable radio apparatus.

Figure 1:
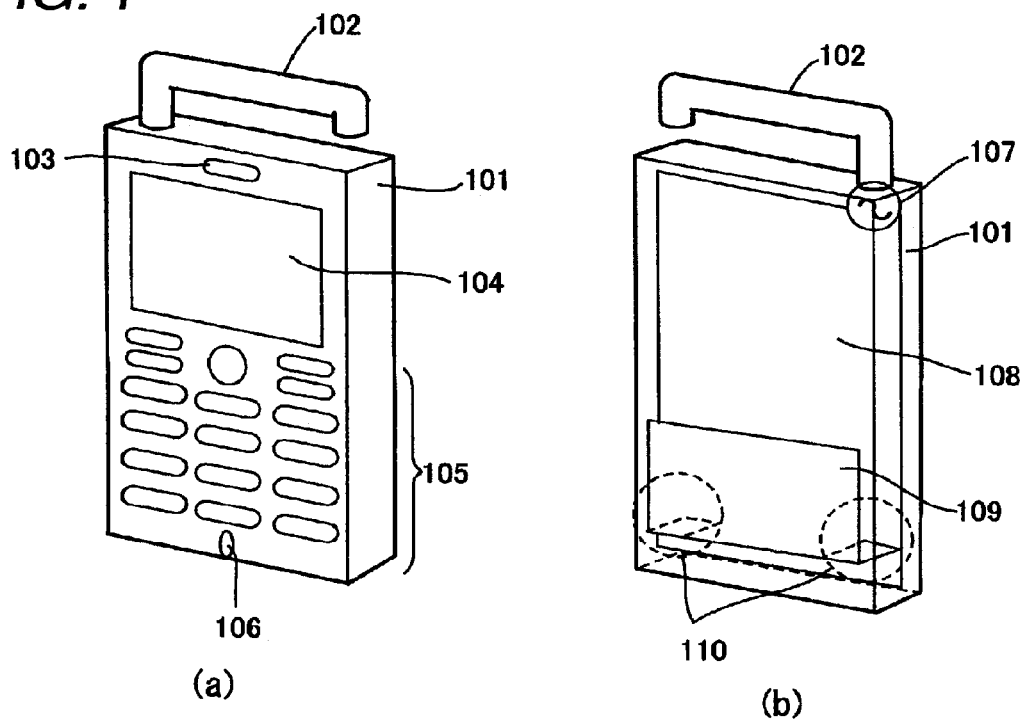
[FIG. 1] Configuration views of a portable radio apparatus mounted with an antenna device for a radio apparatus according to a first embodiment of the present invention.

DESCRIPTION OF REFERENCE NUMERALS 101,501,801,1101,1401,1701,2001,2101 housing
102,201,502,802,1102,1402,1702,2001,2102 antenna element
103,503,803,1103,1403,1703,2003,2103 receiver portion
104,504,804,1104,1404,1704,2004,2104 display portion
105,505,805,1105,1405,1705,2005,2105 input portion
106,506,806,1106,1406,1706,2006,2106 transmitter portion
107,507,807,1107,1407,1707,2007,2107 feeding portion
108,508,808,1108,1408,1708,2008,2108 board
109,509,809,1109,1409,1709,2010 conductor plate
110,510,810,1110,1410,1710,2010,2111 short-circuit conductor
2009,2109 cover

BEST MODE FOR CARRYING OUT THE INVENTION

First Embodiment

FIG. 1 are views showing the schematic configuration of a portable radio apparatus according to a first embodiment of the invention. FIG. 1(a) is a front view thereof, and FIG. 1(b) is a back view thereof.

As shown in FIG. 1, the portable radio apparatus according to this embodiment has an antenna element 102 provided to protrude to the outside of a housing 101 and having a length equal to 0.16 wavelength of the operating frequency. As shown in FIG. 1(a), a receiver portion 103 for outputting an audio signal of a call destination, a display portion 104 for displaying characters of a telephone number or the like, an input portion 105 for inputting a telephone number or characters, and a transmitter portion 106 for inputting an audio signal of a user are provided in a front surface portion of the housing 101.

As shown in FIG. 1(b), a feeding portion 107 and a board 108 are provided inside the housing 101. The feeding portion 107 feeds power to the antenna element 102. The board 108 has a radio circuit and a control circuit. The board 108 has a length equal to 0.26 wavelength and a width equal to 0.12 wavelength. The board 108 serves as a base plate of the antenna element 102.

In this embodiment, the surface having a length equal to 0.26 wavelength and a width equal to 0.12 wavelength will be referred to as a main surface of the board 108. The main surface of the board 108 is provided substantially in parallel with the front surface and the back surface of the housing 101. The feeding portion 107 is provided in a longitudinally upper end portion and a width-direction one end portion of the main surface of the board 108.

Further, a conductor plate 109 and two short-circuit conductors 110 are provided on the back surface side in the inside of the housing 101. The conductor plate 109 has a main surface having a positional relationship in which the main surface faces the main surface of the board 108 substantially in parallel thereto. The short-circuit conductors 110 short-circuit the conductor plate 109 to the ground of the board 108. Each short-circuit conductor 110 has a length equal to 0.02 wavelength.

The antenna element 102 is a bent monopole antenna. One end (lower end portion of the main surface) of the conductor plate 109 is short-circuited to the lower end portion of the board 108 through the short-circuit conductors 110. The lower end portion of the board 108 is located on the side longitudinally opposite to the side where the antenna element 102 is disposed. If a distance is not secured between the conductor plate 109 and the board 108, capacitive coupling will prevent the conductor plate 109 and the board 108 from being regarded as individual boards in terms of high frequency. It is therefore necessary to secure a distance between the conductor plate 109 and the board. In this embodiment, the conductor plate 109 is disposed on the back surface side where a distance can be secured. However, the conductor plate 109 may be provided on the front surface side if a distance can be secured between the conductor plate 109 and the board.

Figure 2:
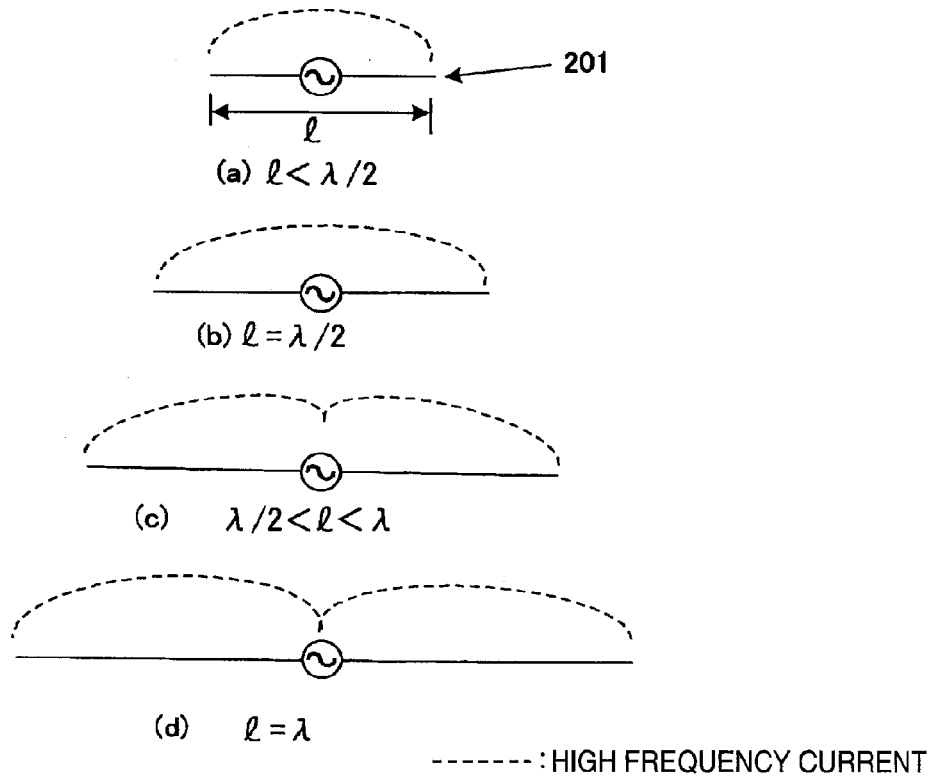
[FIG. 2] Views each showing a distribution of a high frequency current flowing into an antenna element.

SAR is calculated by $\sigma E^2/\rho$ ($\sigma$: conductivity [S/m] of vital tissue, E: field intensity [V/m] in the vital tissue, and $\rho$: density [kg/m$^3$] of the vital tissue). The field intensity depends on a high-frequency current serving as a source of radio waves radiated from the portable radio apparatus). FIG. 2 are views each showing the distribution of a high frequency current contributing to radiation from the antenna. FIG. 2(a) is a view showing the case where the electric length of the antenna element is smaller than ½ wavelength of the operating frequency. FIG. 2(b) is a view showing the case where the electric length of the antenna element is equal to ½ wavelength of the operating frequency. FIG. 2(c) is a view showing the case where the electric length of the antenna element is larger than ½ wavelength of the operating frequency and smaller than one wavelength of the same. FIG. 2(d) is a view showing the case where the electric length of the antenna element is equal to one wavelength of the operating frequency.

As shown in FIG. 2, the distribution of the high frequency current has one peak point when the electric length of the antenna element 201 ranges from ¼ wavelength of the operating frequency to ½ wavelength of the same, and two peak points when the electric length of the antenna element 201 ranges from ½ wavelength to one wavelength. Even when the peak points of the power radiated from the antenna are distributed, the radiated power itself has fixed magnitude. That is, if the total sum of the electric lengths of the antenna element 102, the board 108, the short-circuit conductors 110 and the conductor plate 109 is larger than ½ wavelength of the operating frequency and not larger than one wavelength of the same, peak points of the high frequency current can be distributed.

Figure 3:
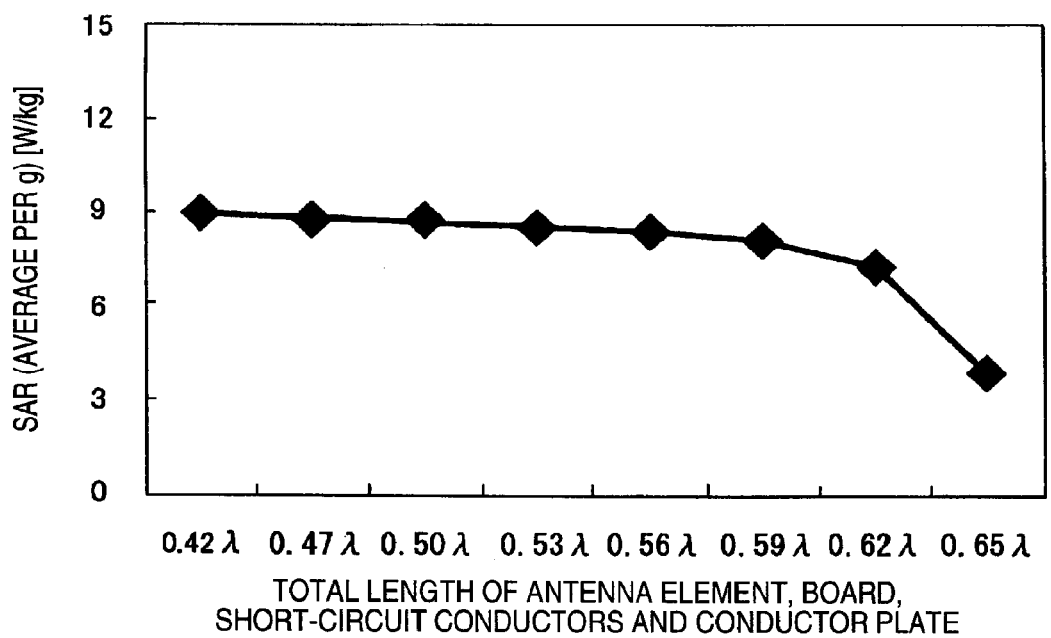
[FIG. 3] A graph showing an SAR characteristic when the length of a conductor plate shown in FIG. 1 is varied.
Figure 4:
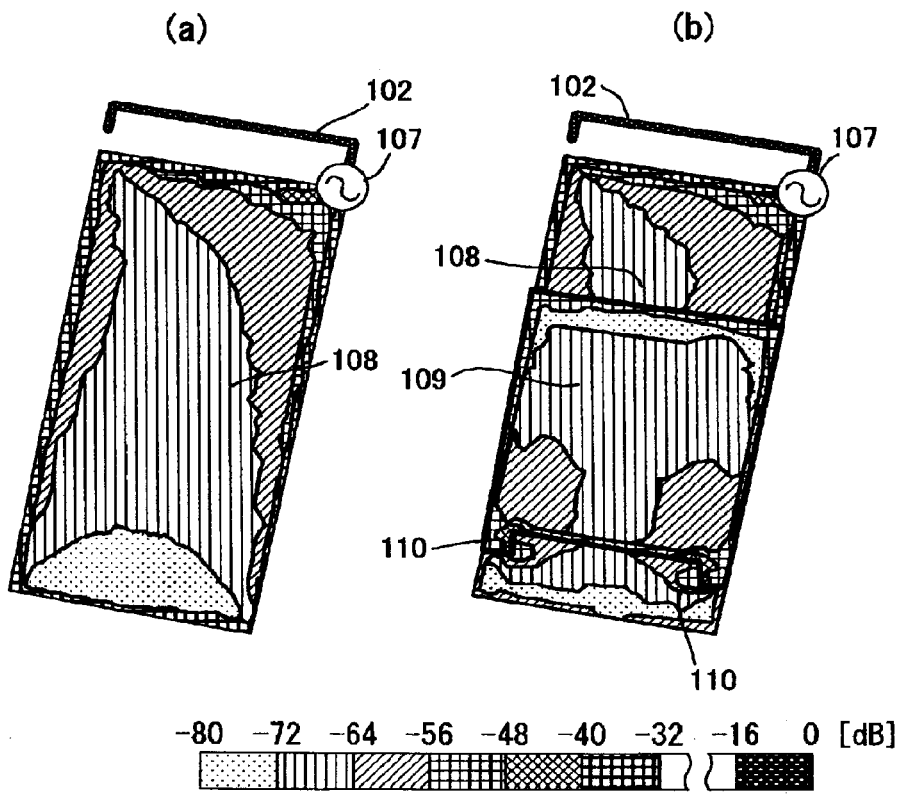
[FIG. 4] Views showing the distribution of the high frequency current in the portable radio apparatus shown in FIG. 1.

FIG. 3 is a graph showing the SAR characteristic when the length of the conductor plate 109 is varied. FIG. 4 are views each showing the distribution of the high frequency current. FIG. 4(a) is a view showing the case where the conductor plate is not attached, and FIG. 4(b) is a view showing the case where the conductor plate is attached. The total sum of the lengths of the antenna element 102, the board 108, the short-circuit conductors 110 and the conductor plate is 0.42 wavelength in FIG. 3 when the short-circuit conductors and the conductor plate are not attached. The length of the conductor plate 109 is adjusted so that the total sum of the electric lengths of the antenna element 102, the board 108, the short-circuit conductors 110 and the conductor plate 109 is larger than ½ wavelength of the operating frequency and not larger than one wavelength of the same. As a result, SAR is improved as shown in FIG. 3, and SAR is improved by about 60% in 0.65 wavelength.

As shown in FIG. 4, it is understood that the peaks of the high frequency current are distributed to the feeding portion 107 and the conductor plate 109 when the conductor plate 109 is attached.

Thus, according to the first embodiment, in a portable radio apparatus having an antenna element, a base plate and a conductor plate, the conductor plate is provided in parallel with the lateral direction of the base plate so that one end of the conductor plate is short-circuited to the base plate at a plurality of places. In this manner, the peak points of a high frequency current contributing to radiation from the antenna are distributed so that SAR can be reduced.

In addition, the conductor plate 109 is short-circuited to the board 108 through a plurality of short-circuit conductors 110. Thus, SAR can be reduced without limiting the length of the conductor plate 109 or without short-circuiting the conductor plate 109 all over the lateral direction of the board 108.

Second Embodiment

Figure 5:
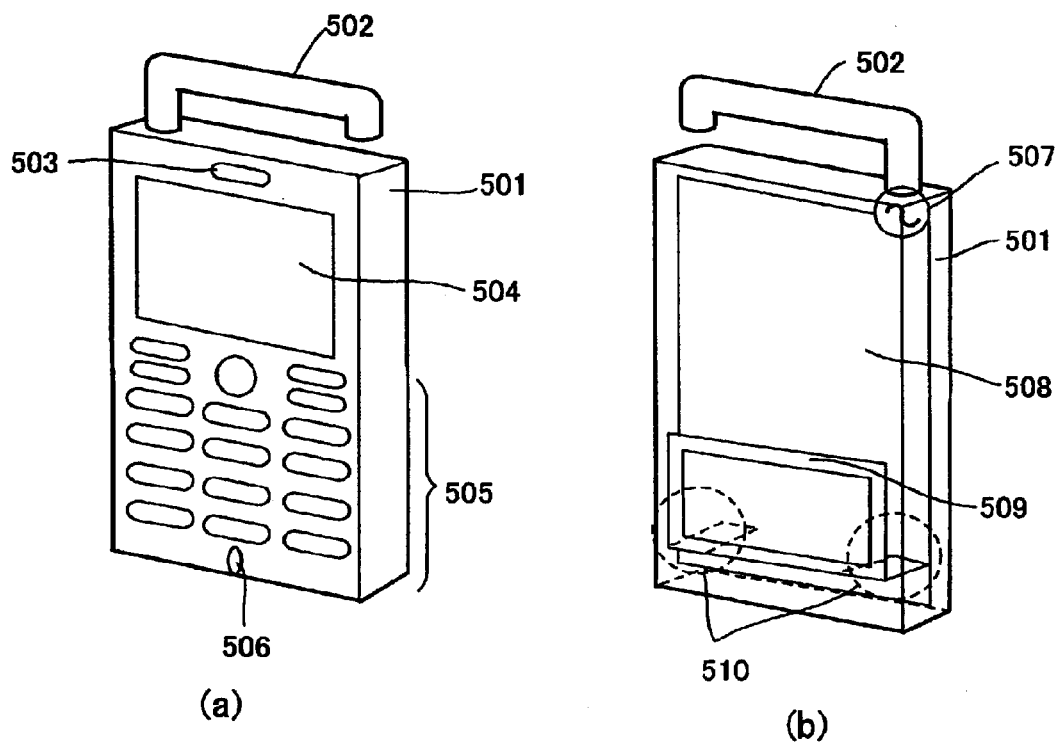
[FIG. 5] Configuration views of a portable radio apparatus mounted with an antenna device for the radio apparatus according to a second embodiment of the present invention.

FIG. 5 are views showing the schematic configuration of a portable radio apparatus according to a second embodiment of the present invention. FIG. 5(a) is a front view thereof, and FIG. 5(b) is a back view thereof. As shown in FIG. 5, the portable radio apparatus according to this embodiment has an antenna element 502 provided to protrude to the outside of a housing 501 and having a length equal to 0.16 wavelength of the operating frequency. As shown in FIG. 5(a), a receiver portion 503 for outputting an audio signal of a call destination, a display portion 504 for displaying characters of a telephone number or the like, an input portion 505 for inputting a telephone number or characters, and a transmitter portion 506 for inputting an audio signal of a user are provided in a front surface portion of the housing 501.

As shown in FIG. 5(b), a feeding portion 507 and a board 508 are provided inside the housing 501. The feeding portion 507 feeds power to the antenna element 502. The board 508 has a radio circuit and a control circuit. The board 508 has a length equal to 0.26 wavelength and a width equal to 0.12 wavelength. The board 508 serves as a base plate of the antenna element 502.

In this embodiment, the surface having a length equal to 0.26 wavelength and a width equal to 0.12 wavelength will be referred to as a main surface of the board 508. The main surface of the board 508 is provided substantially in parallel with the front surface and the back surface of the housing 501. The feeding portion 507 is provided in a longitudinally upper end portion and a width-direction one end portion of the main surface of the board 508.

Further, a conductor plate 509 and two short-circuit conductors 510 are provided on the back surface side in the inside of the housing 501. The conductor plate 509 has a main surface having a positional relationship in which the main surface faces the main surface of the board 508 substantially in parallel thereto. The short-circuit conductors 510 short-circuit the conductor plate 509 to the ground of the board 508. Each short-circuit conductor 510 has a length equal to 0.02 wavelength.

The antenna element 502 is a bent monopole antenna. The conductor 509 is a frame-like conductor plate whose central portion has been cut out. One end (upper end portion of the main surface) of the conductor plate 509 is short-circuited to the lower end portion of the board 508 through the short-circuit conductors 510. The lower end portion of the board 508 is located on the side longitudinally opposite to the side where the antenna element 502 is disposed.

Figure 6:
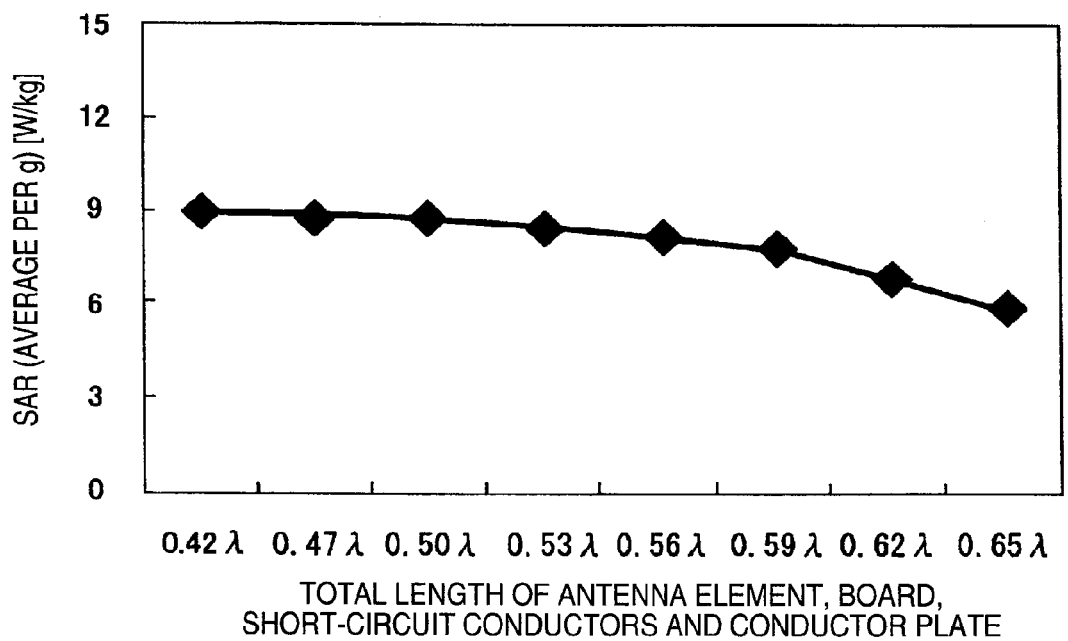
[FIG. 6] A graph showing an SAR characteristic when the length of a conductor plate shown in FIG. 5 is varied.
Figure 7:
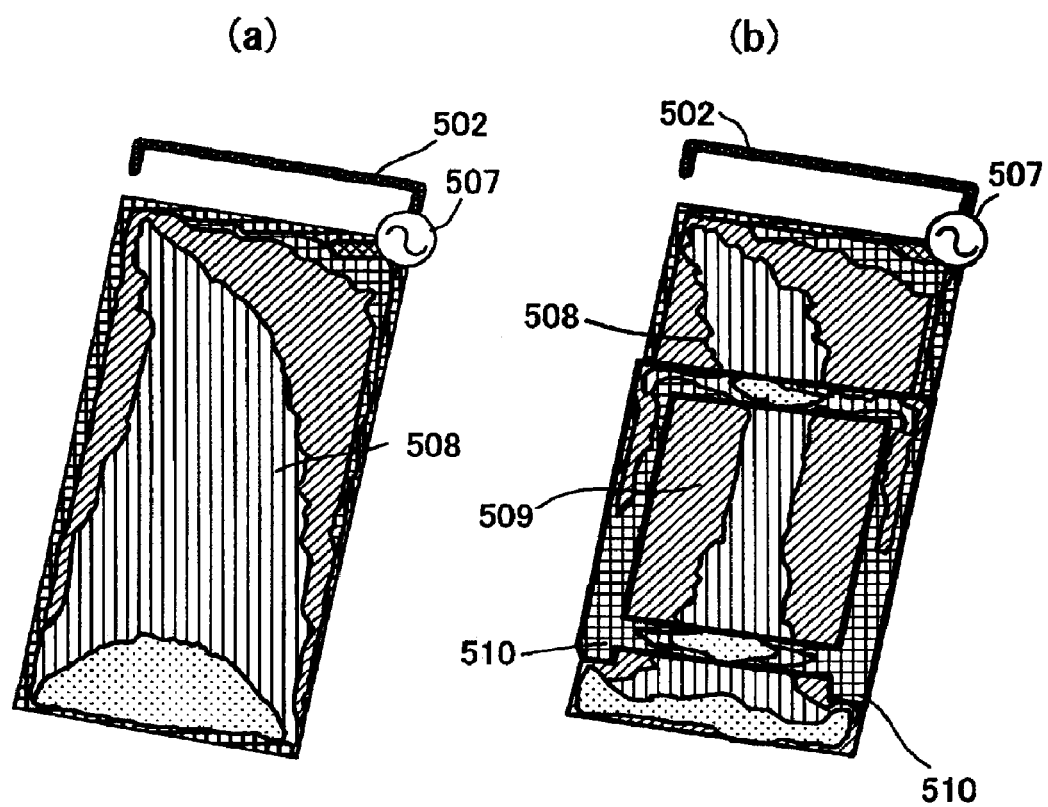
[FIG. 7] Views showing a distribution of a high frequency current in the portable radio apparatus shown in FIG. 5.
Figure 7:

FIG. 6 is a graph showing the SAR characteristic when the length of the conductor plate 509 is varied. FIG. 7 are views each showing the distribution of the high frequency current. FIG. 7(a) is a view showing the case where the conductor plate is not attached, and FIG. 7(b) is a view showing the case where the conductor plate is attached. As shown in FIG. 6, the length of the conductor plate 509 is adjusted so that the total sum of the electric lengths of the antenna element 502, the board 508, the short-circuit conductors 510 and the conductor plate 509 is larger than ½ wavelength of the operating frequency and not larger than one wavelength of the same. As a result, SAR is improved as shown in FIG. 6, and SAR is improved by about 55% in 0.65 wavelength.

As shown in FIG. 7, it is understood that the peaks of the high frequency current are distributed to the feeding portion 507 and the conductor plate 509 when the conductor plate 509 is attached.

Thus, according to the second embodiment, in a portable radio apparatus having an antenna element, a base plate and a conductor plate, the conductor plate is provided in parallel with the lateral direction of the base plate so that one end of the conductor plate is short-circuited to the base plate at a plurality of places, while a central portion of the conductor plate is cut out. In this manner, the peak points of a high frequency current contributing to radiation from the antenna are distributed so that SAR can be reduced.

Third Embodiment

Figure 8:
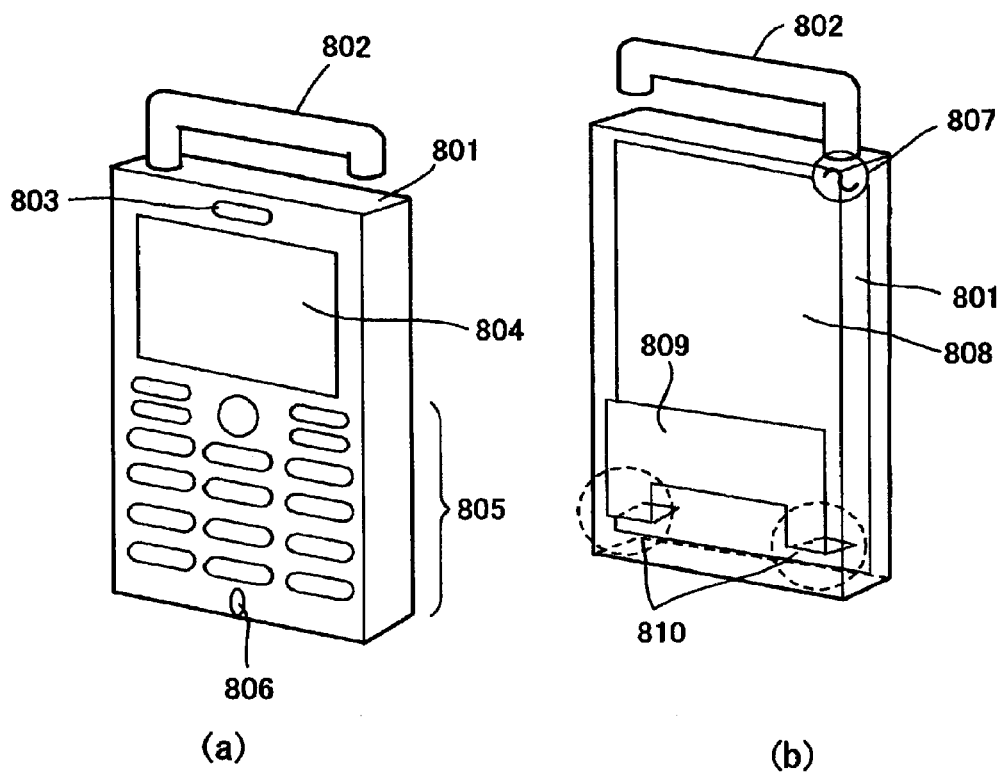
[FIG. 8] Configuration views of a portable radio apparatus mounted with an antenna device for the radio apparatus according to a third embodiment of the present invention.

FIG. 8 are views showing the schematic configuration of a portable radio apparatus according to a third embodiment of the present invention. FIG. 8(a) is a front view thereof, and FIG. 8(b) is a back view thereof. As shown in FIG. 8, the portable radio apparatus according to this embodiment has an antenna element 802 provided to protrude to the outside of a housing 801 and having a length equal to 0.16 wavelength of the operating frequency. As shown in FIG. 8(a), a receiver portion 803 for outputting an audio signal of a call destination, a display portion 804 for displaying characters of a telephone number or the like, an input portion 805 for inputting a telephone number or characters, and a transmitter portion 806 for inputting an audio signal of a user are provided in a front surface portion of the housing 801.

As shown in FIG. 8(b), a feeding portion 807 and a board 808 are provided inside the housing 801. The feeding portion 807 feeds power to the antenna element 802. The board 808 has a radio circuit and a control circuit. The board 808 has a length equal to 0.26 wavelength and a width equal to 0.12 wavelength. The board 808 serves as a base plate of the antenna element 802.

In this embodiment, the surface having a length equal to 0.26 wavelength and a width equal to 0.12 wavelength will be referred to as a main surface of the board 808. The main surface of the board 808 is provided substantially in parallel with the front surface and the back surface of the housing 801. The feeding portion 807 is provided in a longitudinally upper end portion and a width-direction one end portion of the main surface of the board 808.

Further, a conductor plate 809 and two short-circuit conductors 810 are provided on the back surface side of the housing 801. The conductor plate 809 has a main surface having a positional relationship in which the main surface faces the main surface of the board 808 substantially in parallel thereto. The short-circuit conductors 810 short-circuit the conductor plate 809 to the ground of the board 808. Each short-circuit conductor 810 has a length equal to 0.02 wavelength.

The antenna element 802 is a bent monopole antenna. The conductor plate 809 is a U-shaped conductor plate. One end (lower end portion of the main surface) of the conductor plate 809 is short-circuited to the lower end portion of the board 808 through the short-circuit conductors 810. The lower end portion of the board 808 is located on the side longitudinally opposite to the side where the antenna element 802 is disposed.

Figure 9:
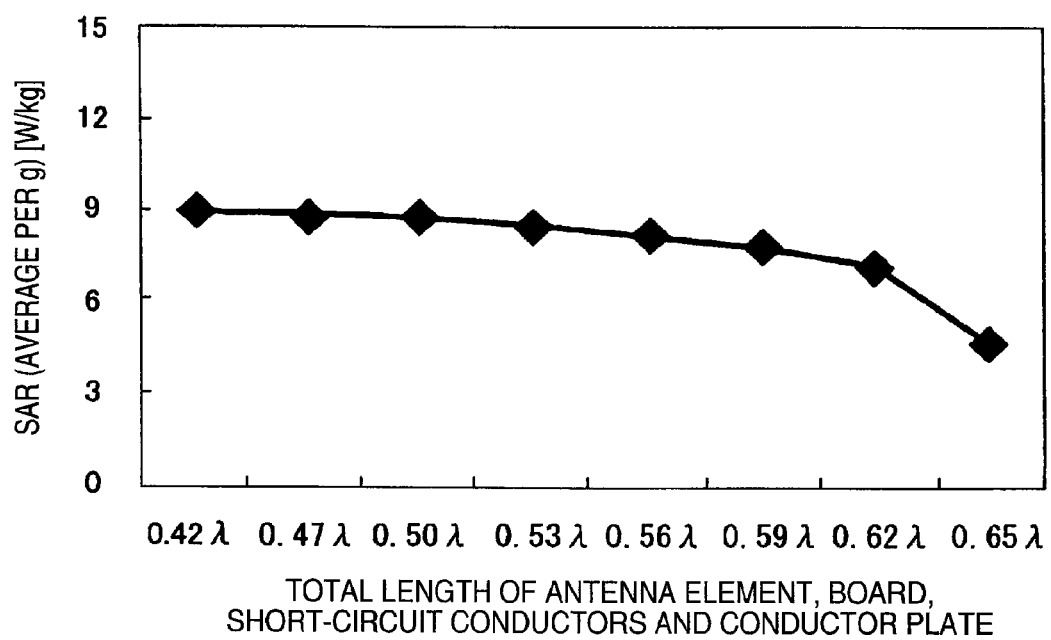
[FIG. 9] A graph showing an SAR characteristic when the length of a conductor plate shown in FIG. 8 is varied.
Figure 10:
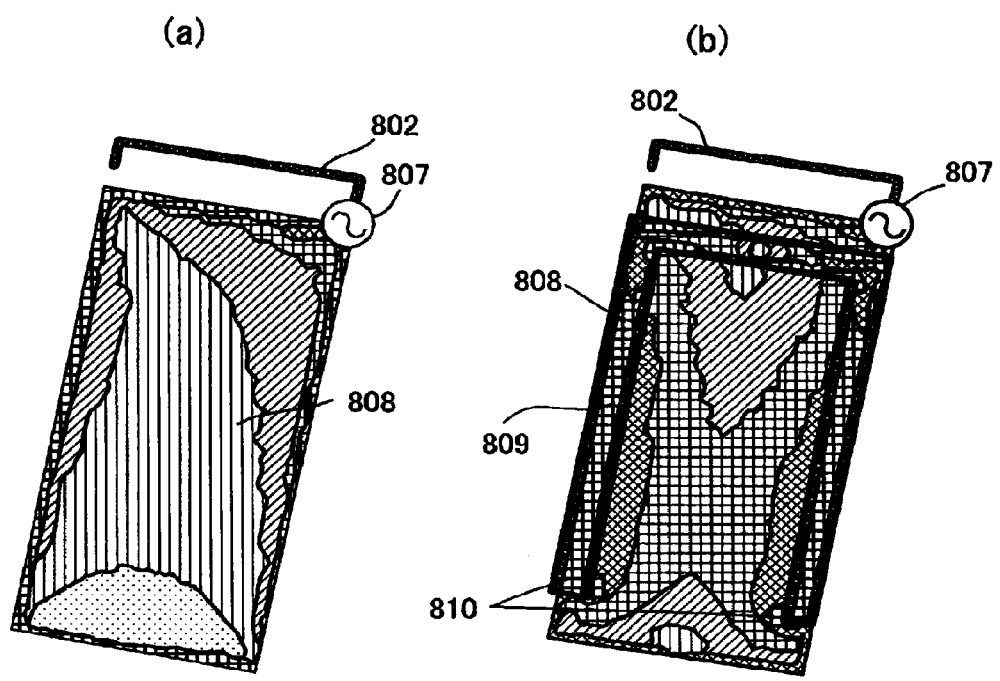
[FIG. 10] Views showing a distribution of a high frequency current in the portable radio apparatus shown in FIG. 8.
Figure 10:

FIG. 9 is a graph showing the SAR characteristic when the length of the conductor plate 809 is varied. FIG. 10 are views each showing the distribution of the high frequency current. FIG. 10(a) is a view showing the case where the conductor plate is not attached, and FIG. 10(b) is a view showing the case where the conductor plate is attached. The length of the conductor plate 809 is adjusted so that the total sum of the electric lengths of the antenna element 802, the board 808, the short-circuit conductors 810 and the conductor plate 809 is larger than ½ wavelength of the operating frequency and not larger than one wavelength of the same. As a result, SAR is improved as shown in FIG. 9, and SAR is improved by about 60% in 0.65 wavelength.

As shown in FIG. 10, it is understood that the peaks of the high frequency current are distributed to the feeding portion 807 and the conductor plate 809 when the conductor plate 809 is attached.

Thus, according to the third embodiment, in a portable radio apparatus having an antenna element, a base plate and a conductor plate, the conductor plate is provided in parallel with the lateral direction of the base plate so that one end of the conductor plate is short-circuited to the base plate at a plurality of places, while the conductor plate is formed into a U-shape. In this manner, the peak points of a high frequency current contributing to radiation from the antenna are distributed so that SAR can be reduced.

Fourth Embodiment

Figure 11:
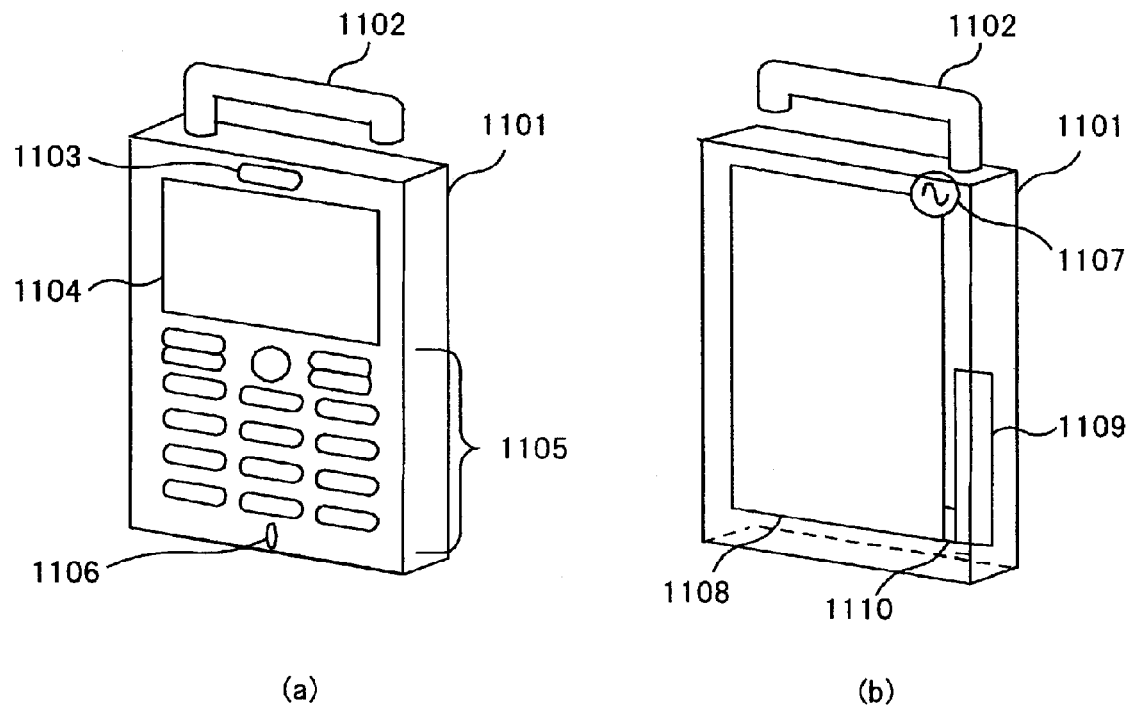
[FIG. 11] Configuration views of a portable radio apparatus mounted with an antenna device for the radio apparatus according to a fourth embodiment of the present invention.

FIG. 11 are views showing the schematic configuration of a portable radio apparatus according to a fourth embodiment of the present invention. FIG. 11(a) is a front view thereof, and FIG. 11(b) is a back view thereof. As shown in FIG. 11, the portable radio apparatus according to this embodiment has an antenna element 1102 provided outside a housing 1101 and having a length equal to 0.16 wavelength of the operating frequency. As shown in FIG. 11(a), a receiver portion 1103 for outputting an audio signal of a call destination, a display portion 1104 for displaying characters of a telephone number or the like, an input portion 1105 for inputting a telephone number or characters, and a transmitter portion 1106 for inputting an audio signal of a user are provided in a front surface portion of the housing 1101.

As shown in FIG. 11(b), a feeding portion 1107 and a board 1108 are provided inside the housing 1101. The feeding portion 1107 feeds power to the antenna element 1102. The board 1108 has a radio circuit and a control circuit. The board 1108 has a length equal to 0.26 wavelength and a width equal to 0.12 wavelength. The board 1108 serves as a base plate of the antenna element 1102.

In this embodiment, the surface having a length equal to 0.26 wavelength and a width equal to 0.12 wavelength will be referred to as a main surface of the board 1108. The main surface of the board 1108 is provided substantially in parallel with the front surface and the back surface of the housing 1101. The feeding portion 1107 is provided in a longitudinally upper end portion and a width-direction one end portion of the main surface of the board 1108.

Further, a conductor plate 1109 and a short-circuit conductor 1110 are provided on one side of the main surface of the board 1108. The conductor plate 1109 has a main surface having a positional relationship in which the longitudinal direction of the main surface is substantially parallel to the longitudinal direction of the board 1108 and the main surface is substantially parallel to the main surface of the board 1108. The short-circuit conductor 1110 short-circuits the conductor plate 1109 to the ground of the board 1108. The short-circuit conductor 1110 has a length equal to 0.02 wavelength.

The antenna element 1102 is a bent monopole antenna. One end (side surface of a lower end portion of the main surface) of the conductor plate 1109 is short-circuited to a side surface of a lower end portion of the board 1108 through the short-circuit conductor 1110. The lower end portion of the board 1108 is located on the side longitudinally opposite to the side where the antenna element 1102 is disposed.

Figure 12:
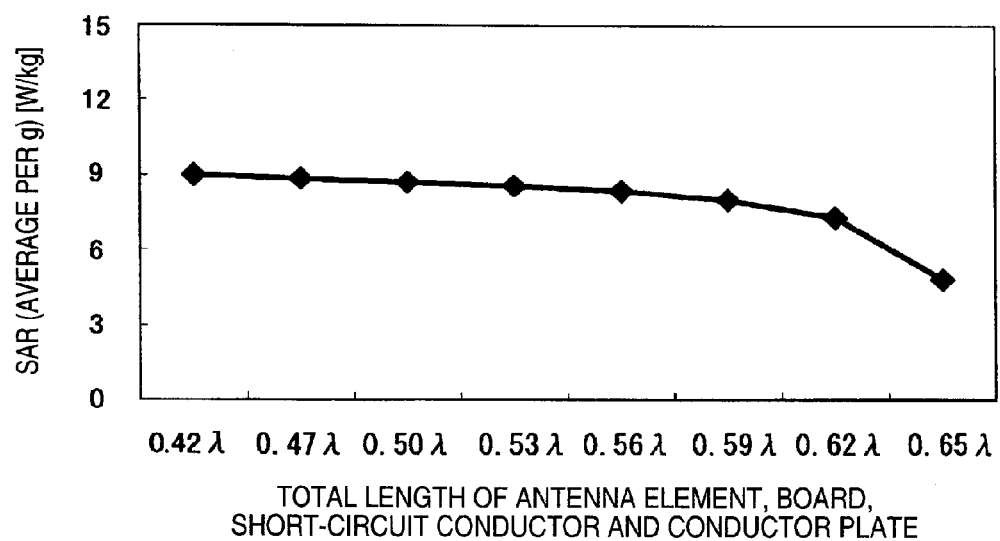
[FIG. 12] A graph showing an SAR characteristic when the length of a conductor plate shown in FIG. 11 is varied.

FIG. 12 is a graph showing the SAR characteristic when the length of the conductor plate 1109 is varied. FIG. 13 are views each showing the distribution of the high frequency current. FIG. 13(a) is a view showing the case where the conductor plate is not attached, and FIG. 13(b) is a view showing the case where the conductor plate is attached. The length of the conductor plate 1109 is adjusted so that the total sum of the electric lengths of the antenna element 1102, the board 1108, the short-circuit conductor 1110 and the conductor plate 1109 is larger than ½ wavelength of the operating frequency and not larger than one wavelength of the same. As a result, SAR is improved as shown in FIG. 12, and SAR is improved by about 45% in 0.65 wavelength.

As shown in FIG. 13, it is understood that the peaks of the high frequency current are distributed to the feeding portion 1107 and the conductor plate 1109 when the conductor plate 1109 is attached.

Thus, according to the fourth embodiment, in a portable radio apparatus having an antenna element, a base plate and a conductor plate, the conductor plate is provided on a side surface of the base plate so that the lower end portion of the conductor plate is short-circuited to the base plate through a short-circuit conductor. In this manner, the peak points of a high frequency current contributing to radiation from the antenna are distributed so that SAR can be reduced.

Fifth Embodiment

FIG. 14 are views showing the schematic configuration of a portable radio apparatus according to a fifth embodiment of the present invention. FIG. 14(a) is a front view thereof, and FIG. 14(b) is a back view thereof. As shown in FIG. 14, the portable radio apparatus according to this embodiment has an antenna element 1402 provided outside a housing 1401. The antenna element 1402 has a length equal to 0.16 wavelength of the operating frequency. As shown in FIG. 14(a), a receiver portion 1403 for outputting an audio signal of a call destination, a display portion 1404 for displaying characters of a telephone number or the like, an input portion 1405 for inputting a telephone number or characters, and a transmitter portion 1406 for inputting an audio signal of a user are provided in a front surface portion of the housing 1401.

As shown in FIG. 14(b), a feeding portion 1407 and a board 1408 are provided inside the housing 1401. The feeding portion 1407 feeds power to the antenna element 1402. The board 1408 has a radio circuit and a control circuit. The board 1408 has a length equal to 0.26 wavelength and a width equal to 0.12 wavelength. The board 1408 serves as a base plate of the antenna element 1402.

In this embodiment, the surface having a length equal to 0.26 wavelength and a width equal to 0.12 wavelength will be referred to as a main surface of the board 1408. The main surface of the board 1408 is provided substantially in parallel with the front surface and the back surface of the housing 1401. The feeding portion 1407 is provided in a longitudinally upper end portion and a width-direction one end portion of the main surface of the board 1408.

Further, a conductor plate 1409 and a short-circuit conductor 1410 are provided on one side of the main surface of the board 1408. The conductor plate 1409 has a main surface having a positional relationship in which the longitudinal direction of the main surface is substantially parallel to the longitudinal direction of the board 1408 and the main surface is substantially vertical to the main surface of the board 1408. The short-circuit conductor 1410 short-circuits the conductor plate 1409 to the ground of the board 1408. The short-circuit conductor 1410 has a length equal to 0.02 wavelength.

The antenna element 1402 is a bent monopole antenna. One end (lower end portion of the main surface) of the conductor plate 1409 is short-circuited to a side surface of a lower end portion of the board 1408 through the short-circuit conductor 1410. The lower end portion of the board 1408 is located on the side longitudinally opposite to the side where the antenna element 1402 is disposed.

Figure 15:
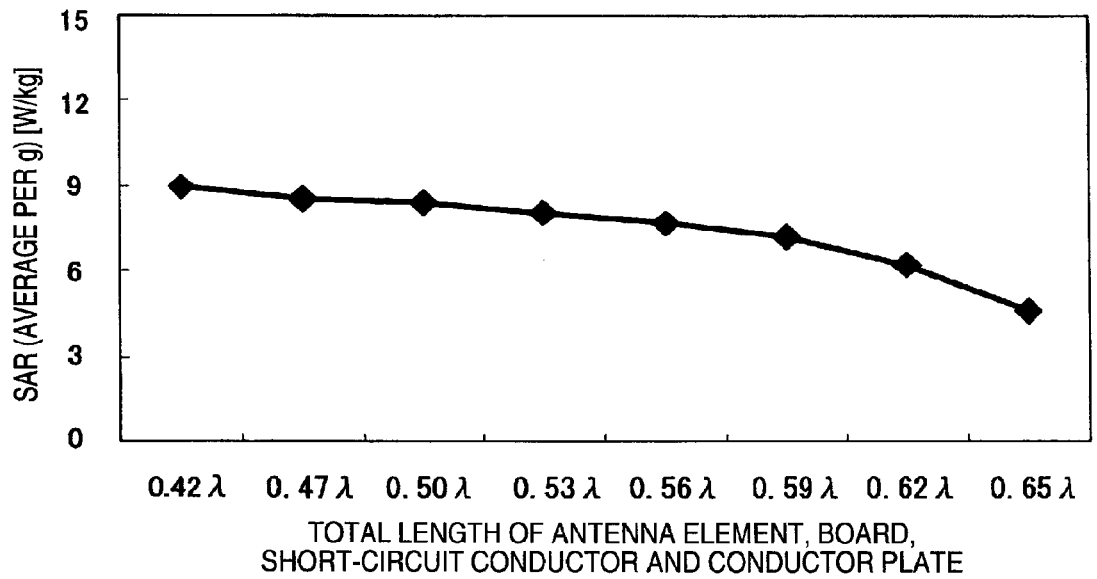
[FIG. 15] A graph showing an SAR characteristic when the length of a conductor plate shown in FIG. 14 is varied.
Figure 16:
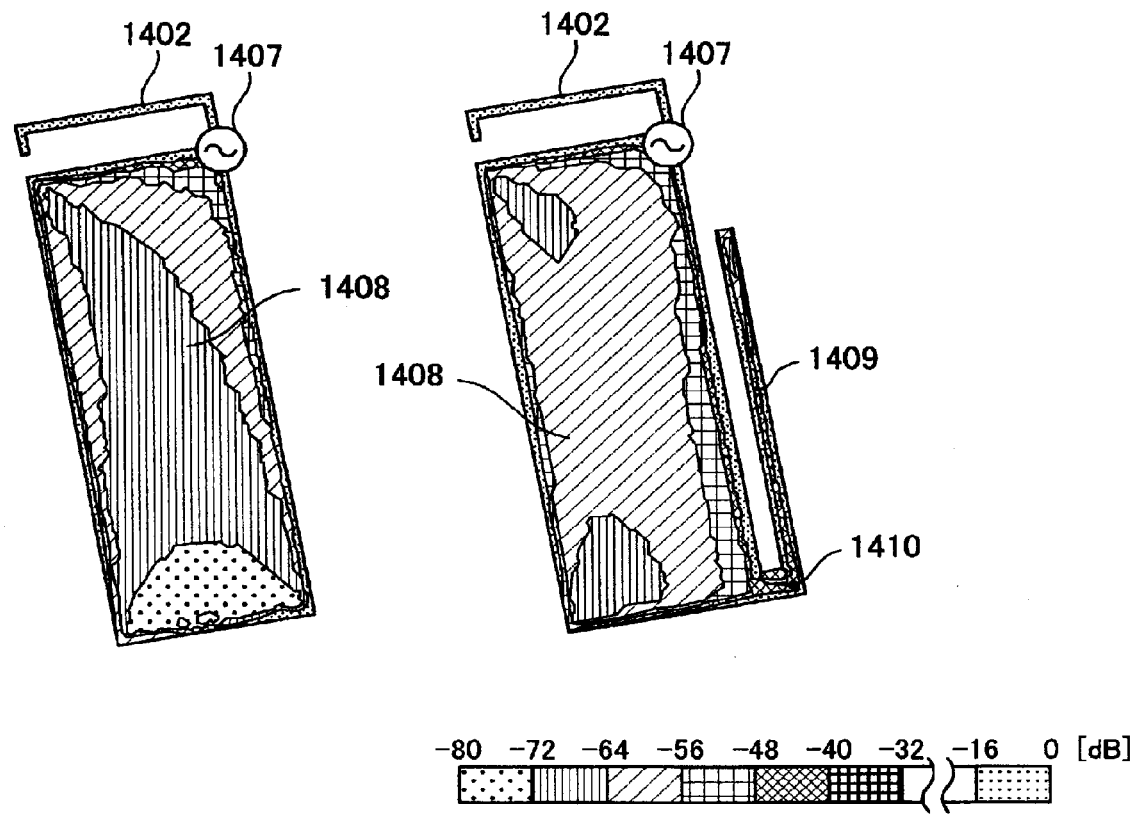
[FIG. 16] Views showing a distribution of a high frequency current in the portable radio apparatus shown in FIG. 14.

FIG. 15 is a graph showing the SAR characteristic when the length of the conductor plate 1409 is varied. FIG. 16 are views each showing the distribution of the high frequency current. FIG. 16(a) is a view showing the case where the conductor plate is not attached, and FIG. 16(b) is a view showing the case where the conductor plate is attached. The length of the conductor plate 1409 is adjusted so that the total sum of the electric lengths of the antenna element 1402, the board 1408, the short-circuit conductor 1410 and the conductor plate 1409 is larger than ½ wavelength of the operating frequency and not larger than one wavelength of the same. As a result, SAR is improved as shown in FIG. 15, and SAR is improved by about 50% in 0.65 wavelength.

As shown in FIG. 16, it is understood that the peaks of the high frequency current are distributed to the feeding portion 1407 and the conductor plate 1409 when the conductor plate 1409 is attached.

Thus, according to the fifth embodiment, in a portable radio apparatus having an antenna element, a base plate and a conductor plate, the conductor plate is provided on a side surface of the base plate so that the lower end portion of the conductor plate is short-circuited to the base plate through a short-circuit conductor. In this manner, the peak points of a high frequency current contributing to radiation from the antenna are distributed so that SAR can be reduced.

Sixth Embodiment

Figure 17:
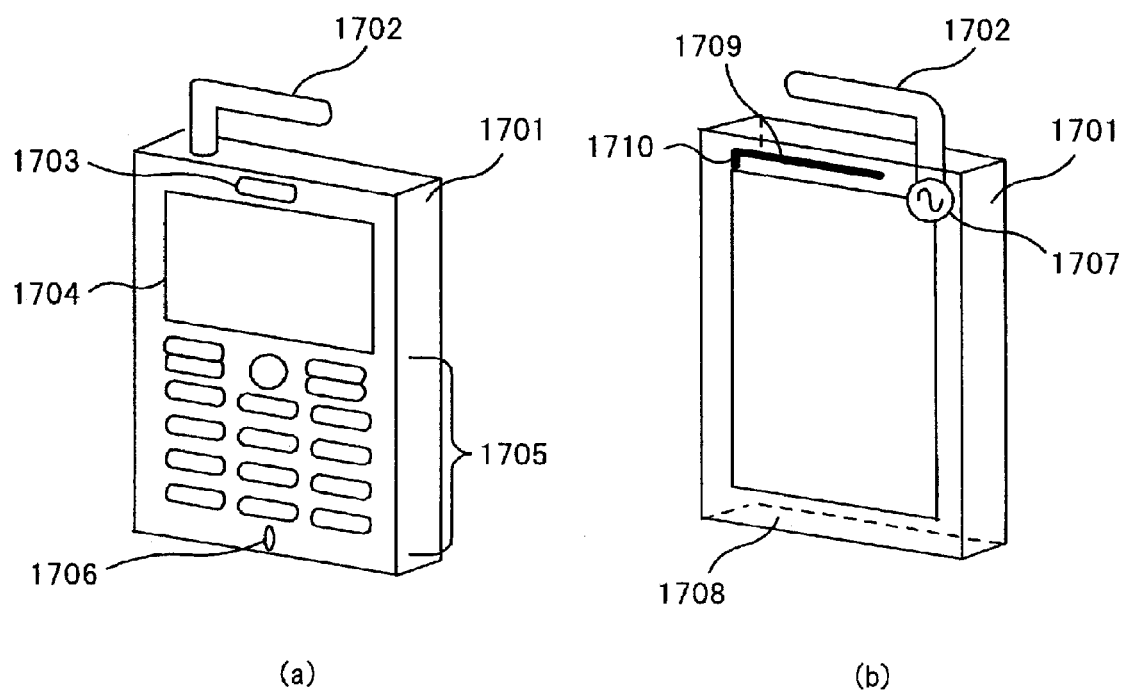
[FIG. 17] Configuration views of a portable radio apparatus mounted with an antenna device for a radio apparatus according to a sixth embodiment of the present invention.

FIG. 17 are views showing the schematic configuration of a portable radio apparatus according to a sixth embodiment of the present invention. FIG. 17(a) is a front view thereof, and FIG. 17(b) is a back view thereof. As shown in FIG. 17, the portable radio apparatus according to this embodiment has an antenna element 1702 provided outside a housing 1701. The antenna element 1702 has a length equal to 0.24 wavelength of the operating frequency. As shown in FIG. 17(a), a front surface portion of the housing 1701 is provided with a receiver portion 1703 for outputting an audio signal of a call destination, a display portion 1704 for displaying characters of a telephone number or the like, an input portion 1705 for inputting a telephone number or characters, and a transmitter portion 1706 for inputting an audio signal of a user.

As shown in FIG. 17(b), a feeding portion 1707 and a board 1708 are provided inside the housing 1701. The feeding portion 1707 feeds power to the antenna element 1702. The board 1708 has a radio circuit and a control circuit. The board 1708 has a length equal to 0.52 wavelength and a width equal to 0.24 wavelength. The board 1708 serves as a base plate of the antenna element 1702.

In this embodiment, the surface having a length equal to 0.52 wavelength and a width equal to 0.24 wavelength will be referred to as a main surface of the board 1708. The main surface of the board 1708 is provided substantially in parallel with the front surface and the back surface of the housing 1701. The feeding portion 1707 is provided in a longitudinally upper end portion and a width-direction one end portion of the main surface of the board 1708.

Further, a conductor plate 1709 and a short-circuit conductor 1710 are provided. The conductor plate 1709 has a main surface having a positional relationship in which the longitudinal direction of the main surface is substantially parallel to the width direction of the board 1708. The short-circuit conductor 1710 short-circuits the conductor plate 1709 to the ground of the board 1708. The short-circuit conductor 1710 has a length equal to 0.04 wavelength.

The antenna element 1702 is a bent pole antenna. One end of the conductor plate 1709 is short-circuited to the other end portion (left end portion in FIG. 17(b)) of the board 1708 through the short-circuit conductor 1710. The other end portion of the board 1708 is located on the width-direction opposite side to the side (one end portion) where the antenna element 1702 is disposed.

Figure 18:
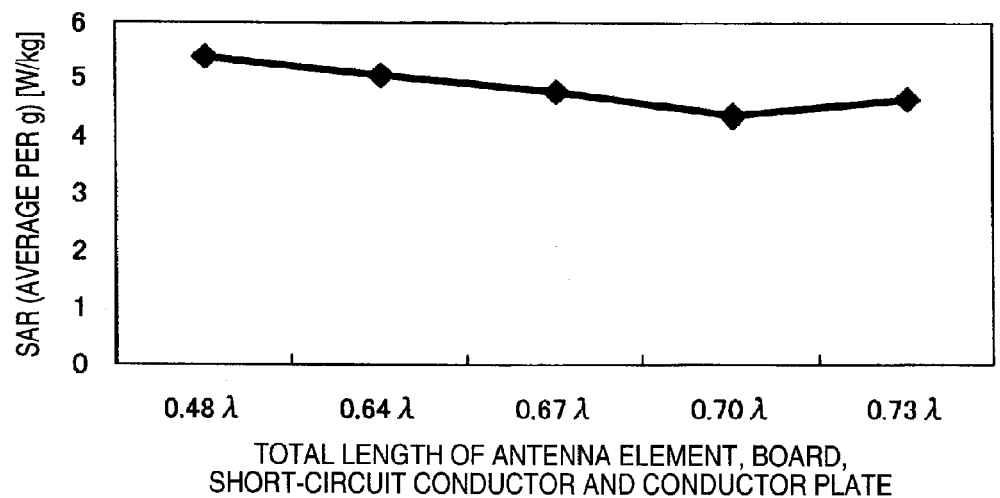
[FIG. 18] A graph showing an SAR characteristic when the length of a conductor plate shown in FIG. 17 is varied.
Figure 19:
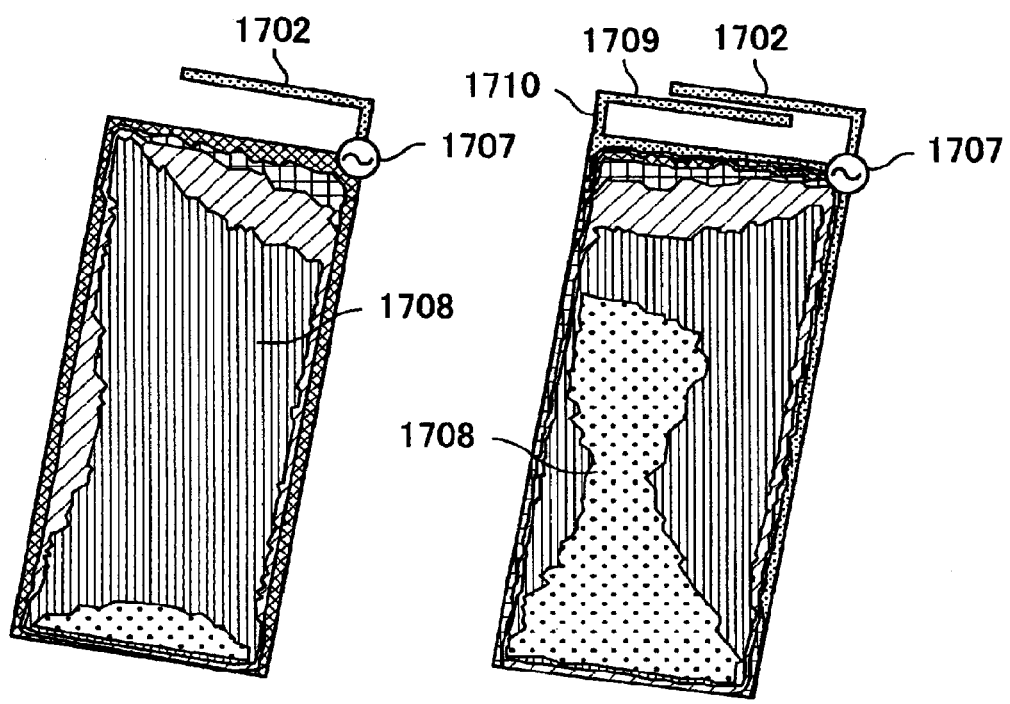
[FIG. 19] Views showing a distribution of a high frequency current in the portable radio apparatus shown in FIG. 17.
Figure 19:
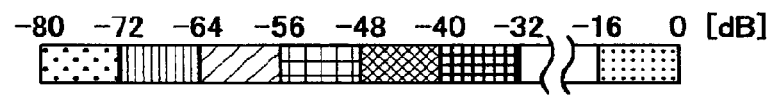

FIG. 18 is a graph showing the SAR characteristic when the length of the conductor plate 1709 is varied. FIG. 19 are views each showing the distribution of the high frequency current. FIG. 19(a) is a view showing the case where the conductor plate is not attached, and FIG. 19(b) is a view showing the case where the conductor plate is attached. The length of the conductor plate 1709 is adjusted so that the total sum of the electric lengths of the antenna element 1702, the board 1708, the short-circuit conductor 1710 and the conductor plate 1709 is larger than ½ wavelength of the operating frequency and not larger than one wavelength of the same. As a result, SAR is improved as shown in FIG. 18, and SAR is improved by about 20% in 0.70 wavelength.

In a high frequency in W-CDMA or the like, the high frequency current also flows in the width direction of the board 1708. Accordingly, as shown in FIG. 19, the peaks of the high frequency current are distributed to the feeding portion 1707 and the conductor plate 1709 when the conductor plate 1709 is attached.

Thus, according to the sixth embodiment, in a portable radio apparatus having an antenna element, a base plate and a conductor plate, the conductor plate is provided on an upper side surface of the base plate so that one end portion of the conductor plate is short-circuited to the base plate through a short-circuit conductor. In this manner, the peak points of a high frequency current contributing to radiation from the antenna are distributed so that SAR can be reduced.

Seventh Embodiment

Figure 20:
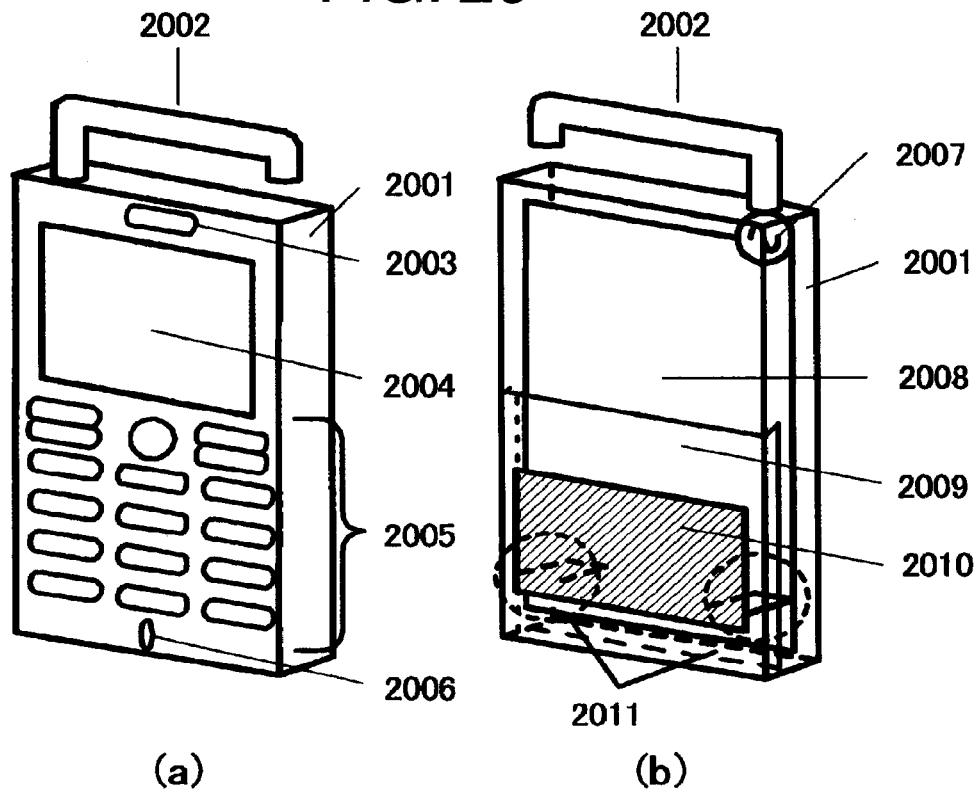
[FIG. 20] Configuration views of a portable radio apparatus mounted with an antenna device for a radio apparatus according to a seventh embodiment of the present invention.

FIG. 20 are views showing the schematic configuration of a portable radio apparatus according to a seventh embodiment of the present invention. FIG. 20(*a*) is a front view thereof, and FIG. 20(*b*) is a back view thereof. As shown in FIG. 20, the portable radio apparatus according to this embodiment has an antenna element 2002 provided outside a housing 2001. As shown in FIG. 20(*a*), a receiver portion 2003 for outputting an audio signal of a call destination, a display portion 2004 for displaying characters of a telephone number or the like, an input portion 2005 for inputting a telephone number or characters, and a transmitter portion 2006 for inputting an audio signal of a user are provided in a front surface portion of the housing 2001.

As shown in FIG. 20(*b*), a feeding portion 2007 and a board 2008 are provided inside the housing 2001. The feeding portion 2007 feeds power to the antenna element 2002. The board 2008 has a radio circuit and a control circuit. The board 2008 serves as a base plate of the antenna element 2002.

Further, a cover 2009, a conductor plate 2010 and two short-circuit conductors 2011 are provided on the back surface side of the housing 2001. The cover 2009 can be removed from the housing in order to put a battery or the like therein. The conductor plate 2010 is attached to the cover 2009 and has a main surface having a positional relationship in which the main surface faces a main surface of the board 2008 substantially in parallel thereto. The short-circuit conductors 2011 short-circuit the conductor plate 2010 to the ground of the board 2008.

The antenna element 2002 is a bent monopole antenna. One end (lower end portion of the main surface) of the conductor plate 2010 is short-circuited to a lower end portion of the board 2008 through the short-circuit conductors 2011. The lower end portion of the board 2008 is located on the longitudinally opposite side to the side where the antenna element 2002 is disposed. The conductor plate 2010 may be shaped as shown in the second or third embodiment.

In the aforementioned configuration, the conductor plate is attached to the cover which is another part than the housing, so that the conductor plate does not have to be provided inside the housing. It is therefore possible to deal with a low-profile portable radio apparatus. Further, in the distribution of a high frequency current, peaks are distributed in the same manner as in the distribution of a high frequency current in the first embodiment of the present invention. Thus, SAR can be reduced.

Thus, according to the seventh embodiment, in a portable radio apparatus having an antenna element, a base plate and a conductor plate, the conductor plate is attached to a cover, and one end portion of the conductor plate is short-circuited to the base plate through short-circuit conductors. In this manner, the peak points of a high frequency current contributing to radiation from the antenna are distributed so that SAR can be reduced.

Eighth Embodiment

Figure 21:
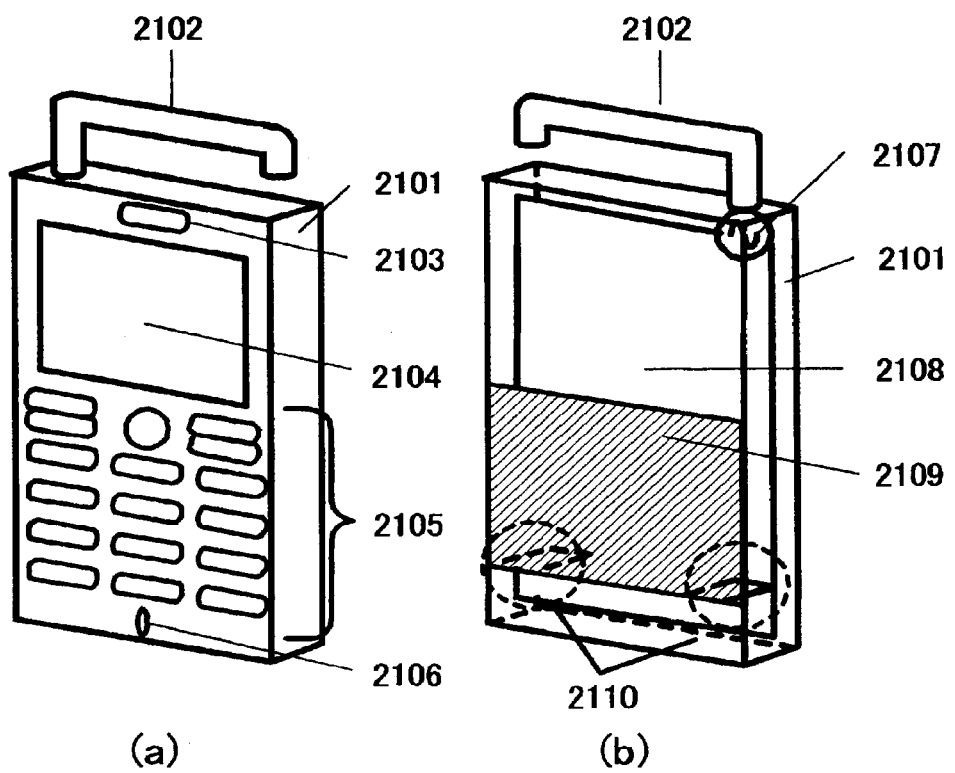
[FIG. 21] Configuration views of a portable radio apparatus mounted with an antenna device for a radio apparatus according to an eighth embodiment of the present invention.

FIG. 21 are views showing the schematic configuration of a portable radio apparatus according to an eighth embodiment of the present invention. FIG. 21(*a*) is a front view thereof, and FIG. 21(*b*) is a back view thereof. As shown in FIG. 21, the portable radio apparatus according to this embodiment has an antenna element 2102 provided outside a housing 2101. As shown in FIG. 21(*a*), a receiver portion 2103 for outputting an audio signal of a call destination, a display portion 2104 for displaying characters of a telephone number or the like, an input portion 2105 for inputting a telephone number or characters, and a transmitter portion 2106 for inputting an audio signal of a user are provided in a front surface portion of the housing 2101.

As shown in FIG. 21(*b*), a feeding portion 2107 and a board 2108 are provided inside the housing 2101. The feeding portion 2107 feeds power to the antenna element 2102. The board 2108 has a radio circuit and a control circuit. The board 2108 serves as a base plate of the antenna element 2102.

Further, a cover 2109 and two short-circuit conductors 2110 are provided on the back surface side of the housing 2101. The cover 2109 is formed out of a conductor so that the cover 2109 can be removed from the housing in order to put a battery or the like therein. The conductors 2110 short-circuit the cover 2109 to the ground of the board 2108.

The antenna element 2102 is a bent pole antenna. One end (lower end portion of the main surface) of the cover 2109 is short-circuited to a lower end portion of the board 2108 through the short-circuit conductors 2110. The lower end portion of the board 2108 is located on the longitudinally opposite side to the side where the antenna element 2102 is disposed. The cover 2109 may be shaped as shown in the second or third embodiment. The cover may be formed out of a combination of a conductor shaped as shown in the second or third embodiment and a nonconductor such as resin or the like.

In the aforementioned configuration, a conductor is used as the material of the cover so that the conductor plate does not have to be provided in the portable radio apparatus. It is therefore possible to deal with a low-profile portable radio apparatus. Further, the distribution of a high frequency current is the same as the distribution of a high frequency current in the first embodiment of the present invention. Thus, SAR can be reduced.

Thus, according to the eighth embodiment, in a portable radio apparatus having an antenna element, a base plate and a conductor plate, the conductor plate is provided on an upper side surface of the base plate, and one end portion of the conductor plate is short-circuited to the base plate through short-circuit conductors. In this manner, the peak points of a high frequency current contributing to radiation from the antenna are distributed so that SAR can be reduced.

In the first, second, third, fourth, fifth and sixth embodiments, a monopole antenna whose element is bent is used. However, even by use of an antenna using a base plate, such as a monopole antenna, a helical antenna, an inverted-L antenna or the like, a similar effect can be obtained. Although a conductor plate and a short-circuit conductor or conductors are formed individually, a similar effect can be obtained if they are integrated. Further, a similar effect can be obtained if the board, the conductor plate and the short-circuit conductor or conductors are integrated. Moreover, a similar effect can be obtained if the conductor plate and the short-circuit conductor or conductors are patterned in a board serving as a base plate of the antenna.

The present invention has been described in detail and with reference to its specific embodiments. It is, however, obvious to those skilled in the art that various changes or modifications can be made on the present invention without departing from its spirit and scope.

This application is based on a Japanese patent application (Japanese Patent Application No. 2004-281586) filed on Sep. 28, 2004, and a Japanese patent application (Japanese Patent Application No. 2005-116049) filed on Apr. 13, 2005, contents of which are incorporated herein by reference.

INDUSTRIAL APPLICABILITY

An antenna device for a radio apparatus according to the present invention can reduce SAR without lowering the power radiated from the antenna, so that a high quality of communication can be secured during a call. Thus, the antenna is useful in a portable radio apparatus or the like.

The invention claimed is:

1. An antenna device for a radio apparatus, comprising:
    a base plate having; multiple surfaces, one of the multiple surfaces being a main surface, the main surface having the largest surface area among the multiple surfaces of the base plate;
    an antenna element disposed on a first end portion of the main surface of the base plate, the antenna element connected to the first end portion of the base plate through a feeding portion;
    a conductor plate disposed outwardly of the base plate in a width direction of the main surface of the base plate, the conductor plate having multiple surfaces, one of the multiple surfaces of the conductor plate being a conductor plate main surface, the conductor plate main surface having the largest surface area of the multiple surfaces of the conductor plate and being perpendicular to the main surface of the base plate; and
    a short-circuit conductor connected to a second end portion of the base plate, the second end portion being opposite the first end portion of the base plate;
    wherein the conductor plate is short-circuited to the second end portion of the main surface of the base plate through the short-circuit conductor.

2. The antenna device for the radio apparatus according to claim 1, wherein a total sum of electric lengths of the antenna element, the base plate, the short-circuit conductor and the conductor plate is greater than ½ wavelength of an operating frequency and not larger than one wavelength of the operating frequency.

3. A portable radio apparatus comprising an antenna device according to claim 1.

* * * * *